March 5, 1940.                L. F. MUTER                2,192,797
                        MERCURY SWITCH APPARATUS
                        Filed July 30, 1937          2 Sheets-Sheet 1
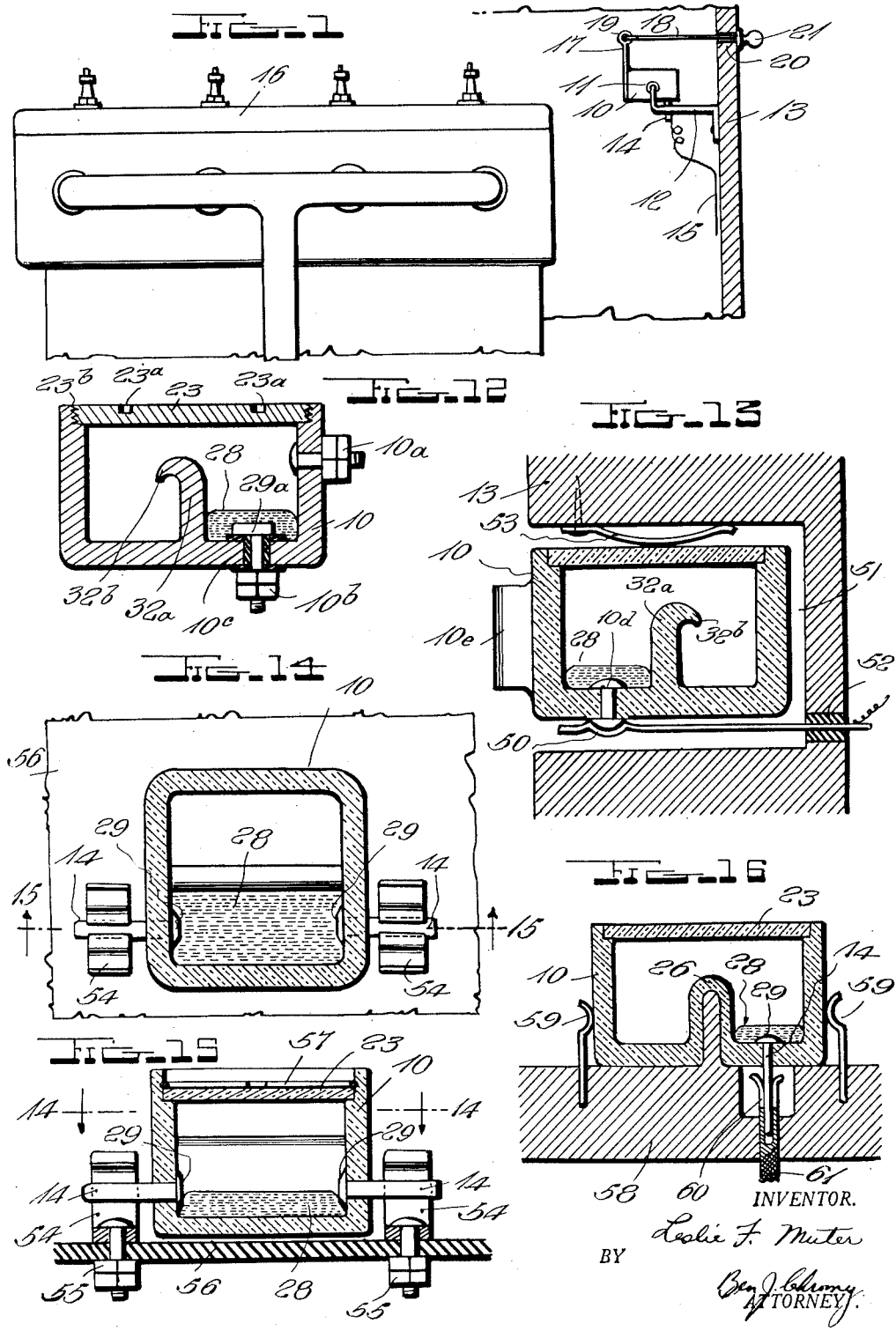
INVENTOR.
Leslie F. Muter
BY
Ben J. Calvany
ATTORNEY.

March 5, 1940. L. F. MUTER 2,192,797
MERCURY SWITCH APPARATUS
Filed July 30, 1937 2 Sheets-Sheet 2
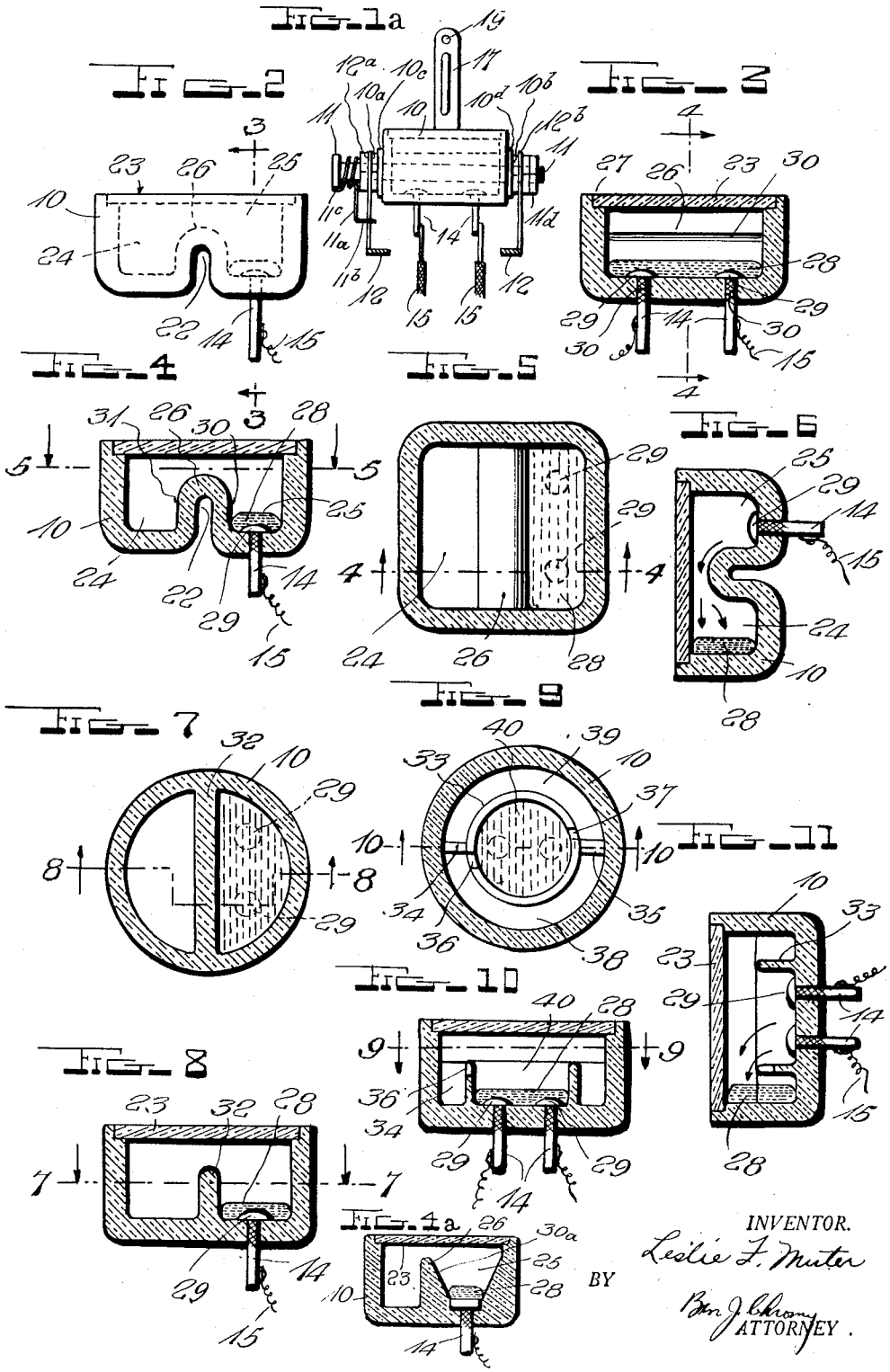
INVENTOR.
Leslie F. Muter
BY
ATTORNEY.

Patented Mar. 5, 1940

2,192,797

UNITED STATES PATENT OFFICE 2,192,797

MERCURY SWITCH APPARATUS

Leslie F. Muter, Chicago, Ill.

Application July 30, 1937, Serial No. 156,599

5 Claims. (Cl. 200—52)

This invention relates to electrical switches and associated apparatus generally. More particularly this invention relates to electrical switch apparatus of the mercury contact type adapted to be carried by a moving vehicle or craft to control an electric circuit upon a condition of collision or the like.

An object of this invention is to provide a mercury contact switch which will positively and efficiently interrupt or otherwise disable the electrical circuits, such as, the ignition, horn and lighting circuits of an automobile or aircraft upon a condition of collision or the like, so that danger of gasolene spilled over the automobile or aircraft motor or chassis being ignited from electrically charged conductors coming in contact with one another or with the vehicle frame or chassis will be obviated.

Another object of this invention is to provide a switch of the mercury contact type which may be easily and economically made in substantial quantities.

Still another object of this invention is to provide a switch of the mercury contact type which may be easily mounted on the dash board or other convenient place on the vehicle to be easily accessible to the vehicle operator when desired.

Still a further object of this invention is to provide a switch of simple and inexpensive construction which will break a circuit when it is tipped to the right or left or turned over or when a sharp impact occurs, to interrupt or disable the ignition in the automobile or airplane motor and prevent fire therein.

A further object of this invention is to provide an electrical circuit controlling arrangement, including a switch, to disable the ignition circuit of an automobile or aircraft motor upon a condition of collision or the like, said switch being positioned in an accessible place near the automobile or aircraft engine and having associated therewith means for resetting same from the dash or instrument board of the automobile or aircraft.

Other and further objects of this invention will be apparent to those skilled in the art to which it relates, from the following specification and the claims.

In accordance with this invention, I connect an automatically operable switch of simple and reliable construction into the ignition or similar operating circuit of an internal combustion engine, using highly inflammable fuel, so that this circuit will automatically be disabled in case of collision or similar emergency, thereby preventing this electrical circuit from igniting the fuel that may be spilled or vaporized. In many if not all of the cases where motor vehicles have been set on fire after a collision the cause of the fire can be traced to the fact that highly inflammable fuel was used and that this fuel was ignited by the electrical circuit of the motor. It is extremely difficult to prevent the gasolene or other highly inflammable fuel from spilling after a violent collision, particularly if the fuel tank is punctured and the fuel spilled by the impact of the collision or if a fuel feed line is broken. Furthermore the force of the impact may be sufficient to spill fuel out of the carburetor of the motor over the motor and ignition apparatus where it is readily ignited. Automatically disabling the electrical circuits of the motor, particularly the ignition circuit, will prevent ignition of spilled fuel and vaporized fuel.

The practical embodiment of my invention employs a mercury type of switch made in such a manner that the circuit therein may be broken either by a collision or by overturning the craft or vehicle.

I have also incorporated means in my invention whereby the mercury switch may be either easily disconnected from the vehicle circuit and tilted to re-establish the circuit in the switch, after which the switch is re-connected by a simple plug-in or clip arrangement, or without disconnecting the switch it may be tilted by a lever mechanism operable from the dash, instrument or control board of the vehicle so that the circuit in the switch is re-established.

The various features of my invention will be readily understood by those skilled in the art to which this invention relates, from the following specification and drawings in which briefly, Fig. 1 shows an embodiment of my invention mounted near the motor with which it is employed; Fig. 1a is a view showing mounting details of the switch shown in Fig. 1; Fig. 2 illustrates a form of the mercury switch employed in accordance with this invention; Fig. 3 is a sectional view taken along the line 3—3 of Fig. 2; Fig. 4 is a view taken along the line 4—4 of Fig. 3; Fig. 4a is a modified form employing a substantially V-shaped mercury pool compartment; Fig. 5 is a sectional view taken taken along the line 5—5 of Fig. 4; Fig. 6 is a sectional view of the switch shown in Fig. 2, tilted to illustrate the operation thereof; Figs. 7 and 8 are sectional views of a modified form of switch taken, respectively, along the lines 7—7 and 8—8; Figs. 9, 10 and 11 illustrate another form of mercury switch in horizontal section, vertical section and vertical section tilted, respectively; Fig. 12 shows another form of switch employing a metallic container; Fig. 13 illustrates a switch with a mounting formed in the dash or control board of a vehicle; Figs. 14 and 15 show a clip form of mounting for a switch with side mounted terminals; and Fig. 16 illustrates still another form of switch mounting.
Referring to Fig. 1 of the drawings in detail, reference numeral 10 designates the container or housing of a mercury switch which is pivotally supported by the bolt 11 and bracket 12 on the automobile dash board 13 adjacent to the engine
16. This switch is provided with a pair of terminals 14 projecting from the bottom thereof and connected to the conductors 15 which are associated with the low potential circuit of the ignition system of the internal combustion engine 16 employed to drive the automobile or aircraft. A lever 17, attached to the container 10 by means of suitable rivets, bolts, screws, cement or similar fastening means, is fastened to the flexible member 18 at the loop or hole 19. The knob 21 made of carved semi-precious stone, molded plastic, metallic or similar material employed for making various forms of hand operated control knobs, is attached to the member 18 and projects from the dash board 13 on the side occupied by the operator of the automobile or aircraft. This knob 21 is employed when it is desired to tilt the mercury switch housing 10 to restore the electrical circuit between the mercury inside of the switch and the terminals as will be described in further detail. In order to tilt the container 10 on its pivotal support the operator pulls the knob 21 and by doing so causes the lever 17 and the member 18 to lift the side of the housing to which the lever 17 is attached. At the same time the opposite side of the container is swung downward between the trunnions 12a and 12b shown in Fig. 1a. When the housing is thus tilted all of the mercury therein is collected in the portion of the housing just above the terminals 14 provided to said container and the electric circuit between these terminals is thereby established by the mercury.

The form of mounting which I have shown in Figs. 1 and 1a employs a bolt member 11 which passes through a trough 22 formed in the bottom of the container as shown in Figs. 2 and 4, directly underneath the partition wall 26 which divides the container into a pair of sinks or small holes 24 and 25. This bolt 11 may be cemented into the trough 22 in order to prevent the switch container from shaking loose, or in cases where the bolt 11 is threaded substantially throughout its length a pair of nuts 10a and 10b may be positioned one on each side of the container 10 to clamp the aforesaid container therebetween. In this case particularly where the container 10 is made of glass or similar material which might be broken through compression between aforesaid nuts, a pair of lead washers 10c and 10d may be employed between the container and the aforesaid nuts.

Where desired a spring 11a having an end 10c thereof attached to the head of the bolt 11 may be positioned concentric with said bolt to facilitate the return of the container 10 to its normal and horizontal position after the container is tilted by the operator through the use of the tilting mechanism shown in Fig. 1. In this case the end 11b of the spring 11a is attached to the container supporting member 12a.

As was also described above, the housing 10 is divided into a pair of sinks 24 and 25 by a relatively low partition 26. The terminals 14 are supported in the bottom of the sink 25 and are provided with heads 29 of material such as iron or similar material which will not readily form an amalgam with the mercury 28. These terminals 14 are preferably cemented into holes formed in the bottom of the container and where it is desired to form a more perfect bond between the terminal surfaces and the cement or material out of which the container 10 is made, the surfaces of the terminals may be roughened or knurled as designated by the reference numeral 30. In cases where the container 10 is made of condensation products such as "Bakelite", the terminals may be positioned in the container walls when the container is being formed or cast. Where the container 10 is made of materials such as glass, suitable holes for receiving the terminals may be formed therein and terminals cemented into said holes by using various cements adapted for use with glass or glasses of different compositions. Furthermore the terminals may be fused into the glass walls particularly where the glass walls are relatively thin.

A cover 23 is provided to the container 10. This cover rests in a groove 27 formed in the inner wall of the mouth of the container and is also cemented to the container or otherwise attached thereto to be held intact unless removed by a person desiring access to the inside of the container.

This cover 23 may be held in place on the container 10 in various ways, for example, it may be threaded and screwed into place as shown in the form of this invention illustrated in Fig. 12 or it may be held in place by a suitable spring ball such as illustrated in Fig. 15.

The switch shown in Fig. 4a employs a substantially V-shaped mercury pool compartment or sink 25. The side 36a of the partition 26 is sloping at an angle between 45 and 60 degrees so that the circuit between the terminals 14 will be interrupted when the motor vehicle reaches a dangerous angle, such as, 45 or 60 degrees, for example.

The switch housing 10 illustrated in Figs. 2 to 6 inclusive is of substantially rectangular shape with the corners thereof rounded off as illustrated. The container may however be circular in shape as illustrated in Figs. 7 and 9 or it may be any other desirable shape.

The form of this invention shown in Figs. 7 and 8 is substantially like that illustrated in Figs. 2 and 4 except that no trough 22 is provided to the bottom of the container shown in Figs. 7 and 8.

Another form of switch housing is illustrated in Figs. 9, 10, and 11. In this embodiment of my invention a substantially circular wall or baffle 33 is positioned inside of the container and is integral with the bottom of said container. This wall is concentric with the circular side wall and defines two semi-circular spaces 38 and 39 the ends of which are divided from each other by the partitions 34 and 35 which join the ring-shaped wall 33 to the circular sides of the container. The space 40 inside of the ring 33 is normally occupied by the mercury pool 28. Provision is made in the bottom of this space for the terminals 14 the heads 29 of which extend into said space and contact the mercury.

When the mercury switch of my invention is installed on a motor vehicle and connected into the electrical circuit of the ignition system, for example, the switch is positioned so that the mercury pool 28 is in contact with the heads 29 of the terminals 14 during the normal operation of the vehicle. Should the vehicle collide with another vehicle or object, the abrupt change in the motion of the vehicle carrying the switch would cause the mercury 28 to leave the space 25, in the case of the switch shown in the Figs. 2 to 6 inclusive or the space 40 in the case of the switch shown in Figs. 9, 10 and 11, and the circuit between the terminals 14 would thereupon be interrupted. The mercury 28 after leaving the space 25 would enter the space 24, moving across the partition 26 in the case of the switch illustrated in Figs. 2 to 6 inclusive or in the case shown in Figs. 7 and 8 the mercury would be thrown, by the force of the impact, across the wall 32. Where the switch illustrated in Figs. 9, 10 and 11 is employed the mercury may be forced by the impact of the collision from the space 40 into either or both of the spaces 38 and 39 and the electrical circuit between the terminals 14 would be disconnected in either case.

Where the motor vehicle, particularly an automobile, employing this apparatus is overturned because of a collision or for any other reason the mercury 28 automatically interrupts the circuits between the terminals 14 inasmuch as the switch housing would during the course of the accident assume a tipped position, such as, for example, shown in Figs. 6 and 11. Various other tilted or tipped positions might be assumed by the switch container as a result of an accident as shown in Figs. 6 and 11 and the circuit in the switch be interrupted. Furthermore, the switch container might be returned to its normal horizontal position after the collision and yet the circuit between the terminal 14 be interrupted because the mercury 28 is confined to a space other than the space occupied by the electrical terminals. This is particularly true of the form of my invention shown in Figs. 9, 10 and 11 wherein the mercury after being thrown from the space 40 into either or both of the spaces 38 or 39, must be concentrated against the baffles 34 and 35 in order to be transferred back into the space 40 through the small notches 36 and 37. For example, the mercury in space 38 must be concentrated against the baffle 34 by tilting the switch so that the baffle 34 is at the lowest end of the space 38. The mercury then flows toward this baffle. Then by further tilting the switch container so that the baffle 34 becomes almost horizontal the mercury will flow toward the notch 36 and through it into the space 40. In the same manner the mercury from the space 39 may be emptied into the space 40 through the notch 37. After this is done the switch container is again placed in its horizontal position and the mercury again connects the heads 29 of the terminal 14.

In Fig. 12 I have illustrated a mercury switch employing a container 10 made of metallic material, such as, iron. This container is provided with a cover 23, also of metallic material, which is threaded around its periphery. Similar threads are formed in the mouth of the container 10 and the cover is screwed into place on the container by means of a wrench adapted to engage the said cover in the holes 23a which extend only part way through the cover as illustrated. The container is provided with a binding-post 10a or similar connecting device. Another terminal 10b insulated from the container 10 by means of insulation sleeves and washers 10c is supported by said insulation in one of the sinks of the container and is normally in contact with the mercury 28. The mercury completes the circuit between the head 29a of the terminal 10b and the container 10. When however, the mercury is displaced from its position around the terminal head 29a this electrical circuit is interrupted.

The mercury employed in the switch illustrated in Fig. 12 may be displaced from the sink with which the terminal 10b is associated by collision of the motor vehicle in which the switch is employed with another object, the collision causing the mercury to leave its normal position around the terminal head 29a and cross the baffle 32a into the place of the other side of this baffle. The baffle 32a is provided with a curved portion 32b which prevents the mercury 28 from rebounding back into the original space occupied by it around the terminal head 29a, once the mercury is forced by the impact of a collision across the baffle 32a. This hook shaped portion 32b of the baffle is co-extensive with said baffle and may be formed to assume different shapes. For example, this hook may extend well over toward the opposite wall of the container so that it covers a substantial part of the space over which it projects. The same form of baffle is employed in the switch illustrated in Fig. 13. This switch is formed with rivet-shaped contacts 10d. Each of these contacts employs two heads, the upper head being in contact with the mercury 28 and the lower head being rounded off and adapted to engage the spring contact 50 which projects into the switch-receiving cavity 51 which is formed in the dash or instrument board 13 of the motor vehicle. In cases where the dash board is made of metallic material the spring contacts 50 are insulated by insulation 52 therefrom. This insulation 52 may extend substantially all the way over the spring 50 to the contact 10d particularly where the housing 10 is made of metallic material and only one contact 10d insulated from the container, is employed. In that case the spring 53 which engages the top of the container may be employed to complete the electrical circuit between the metallic container. Where desired the space around the switch container may be filled with suitable packing material, however permitting the switch housing to be withdrawn from the cavity 51, when desired, by the small handle 10e which is made integral with said housing. Thus the circuit in the switch may be re-established after it is broken by displacement of the mercury, simply by withdrawing the switch and tilting it to collect the mercury in the space around the heads of the terminals.

In Figs. 14 and 15 I have illustrated a clip form of mounting for the mercury switch. In this case the terminals 14 are mounted on opposite sides of the switch housing 10 and the heads of these terminals contact the opposite ends of the mercury pool 28. A pair of clips 54 which are bolted to the insulation panel 56 by a pair of binding posts 55 are employed for contacting the terminals 14. The ignition circuit of the motor vehicle is connected to the binding-posts 55. This form of mounting permits the switch to be removed easily and enables the user thereof to replace or adjust the switch readily. The cover 23 employed on the container 10 shown in Fig. 15 also may be easily removed simply by removing the spring bail 57 with a screw-driver or knife.

After the cover is replaced the ball is also replaced and again serves to hold the cover in position.

Another form of mounting which may be used conveniently with the switch illustrated in Fig. 2 is shown in Fig. 16. This mounting employs a plurality of clips 59 mounted in a base 58 and resiliently engaging the sides of the container 10. The terminals 14 contact spring clips 60 which are connected into the electrical circuit of the motor vehicle by means of cables such as cable 61. This mounting also permits easy removing of the switch for re-adjustment or re-placement.

While I have illustrated the side walls 30 and 31 of the partition wall, ridge or baffle 26, Fig. 4, as substantially vertical through the center portion thereof, in certain practical applications of this invention it may be desirable to slope the angle of the wall 30 away from the mercury pool in order to facilitate the mercury leaving the terminal sink. This however is not so essential where the corner between the wall 30 and the bottom of the sink is well rounded and also where the mercury pool is of sufficient volume or size to build up a sloping wall alongside of the wall 30 under the force of an impact. It is not desirable to have the circuit of the switch open at any time upon the imparting of a slight jar or blow to the vehicle or upon the sudden application of braking effort. Should the circuit of the switch be interrupted for any reason not requiring it the switch may be re-set by tilting as described. Where it is found that the mercury is too easily forced out of contact with terminals a mercury amalgam made of mercury and copper, for example, may be used. A mercury amalgam also may be used to increase the current conductivity through the switch and reduce or prevent heating therein.

Where the term "motor vehicle" is employed in the claims it is intended to be broad enough to include aircraft and similar motor propelled vehicles, craft or vessels particularly those employing internal combustion engines and inflammable fuels.

What I claim and desire to secure by Letters Patent is:

1. In a motor vehicle operated control means, a casing member, a partition formed on the base of said casing member and extending upwardly a substantial part of the depth thereof and dividing its interior into two chambers, a pair of electrical terminals in a first one of said chambers, conducting fluid normally positioned in said first chamber, means for controllably pivotally mounting said casing in a normal horizontal position, said partition being of such shape and height that excessive deceleration of said vehicle throws said conducting fluid from said first chamber over said partition into said second chamber, and handle means carried by said casing for manually tilting said casing about its pivotal mounting into a position for causing said fluid to return to said first chamber when it has been displaced there.

2. A device according to claim 1, said casing being substantially rectangular, and said partition extending transversely thereof.

3. A device according to claim 1, said casing being substantially circular, and said partition being substantially circular and concentric with the wall of said casing.

4. A device according to claim 1, the side of said partition facing said first chamber being sloped at an angle of approximately forty-five degrees.

5. In a motor vehicle operated control means, a casing member having a limited portion of its base bent upwardly to form a transverse partition within the interior of said casing and to form a groove extending transversely across its outward surface, said partition extending upwardly a substantial part of the depth of said casing member and dividing its interior into two chambers, a pair of electrical terminals in a first one of said chambers, conducting fluid normally positioned in said first chamber, means extending through said groove for controllably pivotally mounting said casing in normal horizontal position, said partition being of such shape and height that excessive deceleration of said vehicle throws said conducting fluid from said first chamber over said partition into said second chamber, and handle means carried by said casing for manually tilting said casing about its pivotal mounting.

LESLIE F. MUTER.